United States Patent
Shibata

(10) Patent No.: US 10,183,530 B2
(45) Date of Patent: Jan. 22, 2019

(54) LAMINATE, INNER LINER MATERIAL AND PNEUMATIC TIRE

(71) Applicant: The Yokohama Rubber Co., Ltd., Tokyo (JP)

(72) Inventor: Hirokazu Shibata, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 418 days.

(21) Appl. No.: 14/893,272

(22) PCT Filed: Jun. 3, 2014

(86) PCT No.: PCT/JP2014/064748
§ 371 (c)(1),
(2) Date: Nov. 23, 2015

(87) PCT Pub. No.: WO2014/196533
PCT Pub. Date: Nov. 12, 2014

(65) Prior Publication Data
US 2016/0121654 A1    May 5, 2016

(30) Foreign Application Priority Data

Jun. 3, 2013 (JP) .................. 2013-116841

(51) Int. Cl.
| | | |
|---|---|---|
| B32B 25/08 | (2006.01) | |
| B32B 25/16 | (2006.01) | |
| B32B 27/32 | (2006.01) | |
| B32B 27/34 | (2006.01) | |
| B60C 5/14 | (2006.01) | |
| C09J 163/08 | (2006.01) | |
| B60C 1/00 | (2006.01) | |
| C08L 9/00 | (2006.01) | |
| C08L 63/08 | (2006.01) | |
| C08L 15/00 | (2006.01) | |
| B32B 7/12 | (2006.01) | |
| B32B 27/30 | (2006.01) | |
| C08K 5/09 | (2006.01) | |
| C08C 19/06 | (2006.01) | |

(52) U.S. Cl.
CPC .............. *B60C 1/0008* (2013.01); *B32B 7/12* (2013.01); *B32B 25/08* (2013.01); *B32B 25/16* (2013.01); *B32B 27/302* (2013.01); *B32B 27/306* (2013.01); *B32B 27/308* (2013.01); *B32B 27/32* (2013.01); *B32B 27/34* (2013.01); *B60C 5/14* (2013.01); *C08L 9/00* (2013.01); *C08L 15/00* (2013.01); *C08L 63/08* (2013.01); *B32B 2274/00* (2013.01); *B60C 2005/145* (2013.01); *C08C 19/06* (2013.01); *C08K 5/09* (2013.01); *C09J 163/08* (2013.01)

(58) Field of Classification Search
CPC .... B60C 5/14; B60C 1/0008; B06C 2005/145
USPC ........................................ 156/510
See application file for complete search history.

(56) References Cited

U.S. PATENT DOCUMENTS

2014/0110032 A1* 4/2014 Ogasawara ........... B60C 1/0008
                                                      152/510

FOREIGN PATENT DOCUMENTS

| EP | 0857761 A1 | 8/1998 | |
|---|---|---|---|
| EP | 2193939 A1 | 6/2010 | |
| JP | 2000-230054 A | 8/2000 | |
| JP | 2009-528178 A | 8/2009 | |
| JP | 2011-255645 A | 12/2011 | |
| JP | 2012-082323 A | 4/2012 | |
| JP | 2012229280 A * | 11/2012 | |
| WO | WO-2007/070728 A2 | 6/2007 | |
| WO | WO-2012165512 A1 * | 12/2012 | ........... B60C 1/0008 |
| WO | WO-2014/097994 A1 | 6/2014 | |

OTHER PUBLICATIONS

Machine translation of JP 2012-229280A (Year: 2012).*
Extended European Search Report dated Jan. 3, 2017 in EP Appln. 14806973.5.

* cited by examiner

*Primary Examiner* — Ramsey Zacharia
(74) *Attorney, Agent, or Firm* — Polsinelli PC

(57) ABSTRACT

With respect to a laminate of a film formed of a thermoplastic resin or thermoplastic elastomer composition and a layer formed of a rubber composition in which an epoxidized natural rubber is blended, the adhesion between the film and the layer of the rubber composition is improved without using a large amount of the epoxidized natural rubber. A laminate of a film formed of a thermoplastic resin or thermoplastic elastomer composition and a layer formed of a rubber composition, said laminate being characterized in that: 5-60% by mass of a rubber component contained in the rubber composition is composed of an epoxidized natural rubber and 20-50% by mass of the rubber component is composed of a butadiene rubber; and the rubber composition contains an unsubstituted or substituted aromatic carboxylic acid having a pKa of 1.5-4.0 in an amount of 0.5-5 parts by mass per 100 parts by mass of the rubber component.

20 Claims, No Drawings

LAMINATE, INNER LINER MATERIAL AND PNEUMATIC TIRE

CROSS REFERENCE TO RELATED APPLICATIONS

This application is a National Phase filing under 35 U.S.C. § 371 of PCT/JP2014/064748 filed on Jun. 3, 2014; and this application claims priority to Application No. 2013-116841 filed in Japan on Jun. 3, 2013 under 35 U.S.C. § 119. The entire contents of each application are hereby incorporated by reference.

TECHNICAL FIELD

The present invention relates to a laminate including a film of a thermoplastic resin or a thermoplastic elastomer composition and a layer of a rubber composition. The present invention also relates to an inner liner material including the laminate, and a pneumatic tire produced using the laminate as an inner liner material.

BACKGROUND ART

A laminate including a film of a thermoplastic resin or a thermoplastic elastomer composition and a layer of a rubber composition is known as an inner liner material of a pneumatic tire, and to improve the adhesion between the film and the layer of a rubber composition, a technique is known in which epoxidized natural rubber is compounded into the rubber composition (Published. Japanese Translation of PCT International Publication for Patent Application (Kohyo) No. 2009-528178).

CITATION LIST

Patent Literature

[Patent Literature 1] Published Japanese Translation of PCT International Publication for Patent Application. (Kohyo) No. 2009-528178

SUMMARY OF INVENTION

Problems to be Solved by the Invention

However, compounding a large amount of epoxidized natural rubber into a rubber composition in order to improve the adhesion between a film and a layer of the rubber composition disadvantageously results in increased production cost because epoxidized natural rubber is expensive.

It is an object of the present invention to improve the adhesion between a film and a layer of a rubber composition without using a large amount of epoxidized natural rubber.

Means for Solving the Problems

The present inventor discovered that by adding an aromatic carboxylic acid such as salicylic acid to a rubber composition including epoxidized natural rubber, the adhesion between a film and a layer of the rubber composition can be improved without using a large amount of epoxidized natural rubber, thereby completing the present invention.

Thus, the present invention is a laminate including a film of a thermoplastic resin or a thermoplastic elastomer composition and a layer of a rubber composition, wherein the rubber composition includes a rubber component composed of 5 to 60% by weight of an epoxidized natural rubber and 20 to 50% by weight of a butadiene rubber, and the rubber composition includes an unsubstituted or substituted aromatic carboxylic acid having a pKa of 1.5 to 4.0 in an amount of 0.5 to 5 parts by weight based on 100 parts by weight of the rubber component.

The present invention is also an inner liner material for pneumatic tires including the laminate.

The present invention is also a pneumatic tire produced using the laminate as an inner liner material.

The present invention includes the following aspects.

[1] A laminate including a film of a thermoplastic resin or a thermoplastic elastomer composition and a layer of a rubber composition, wherein the rubber composition includes a rubber component composed of 5 to 60% by weight of an epoxidized natural rubber and 20 to 50% by weight of a butadiene rubber, and the rubber composition includes an unsubstituted or substituted aromatic carboxylic acid having a pKa of 1.5 to 4.0 in an amount of 0.5 to 5 parts by weight based on 100 parts by weight of the rubber component.

[2] The laminate according to [1], wherein the unsubstituted or substituted aromatic carboxylic acid is at least one selected from salicylic acid, 4-aminosalicylic acid, benzoic acid, o-aminobenzoic acid, and 2,4-dihydroxybenzoic acid.

[3] The composition according to [1] or [2], wherein the epoxidized natural rubber has a degree of epoxidation of 10 to 75 mol %.

[4] The laminate according to any one of [1] to [3], wherein the thermoplastic resin is at least one selected from the group consisting of poly (vinyl alcohol), ethylene-vinyl alcohol copolymer, nylon 6, nylon 66, nylon 11, nylon 12, nylon 610, nylon 612, nylon 6/66, nylon MXD6, and nylon 6T.

[5] The laminate according to any one of [1] to [3], wherein the thermoplastic elastomer composition is a composition obtained by dispersing an elastomeric component in a thermoplastic resin component, the thermoplastic resin component being at least one selected from the group consisting of poly (vinyl alcohol), ethylene-vinyl alcohol copolymer, nylon 6, nylon 66, nylon 11, nylon 12, nylon. 610, nylon 612, nylon 6/66, nylon MXD6, and nylon 6T, the elastomeric component, being at least one selected from the group consisting of brominated isobutylene-p-methylstyrene copolymer, maleic anhydride-modified ethylene-α-olefin copolymer, ethylene-glycidyl methacrylate copolymer, and maleic anhydride-modified ethylene-ethyl acrylate copolymer.

[6] An inner liner material for pneumatic tires, including the laminate according to any one of [1] to [5].

[7] A pneumatic tire produced using the laminate according to any one of [1] to [6] as an inner liner material.

Advantageous Effects of Invention

According to the present invention, in a laminate of a film of a thermoplastic resin or a thermoplastic elastomer composition and a layer of a rubber composition including epoxidi zed natural rubber, the adhesion between the film and the layer of a rubber composition can be improved without using a large amount of epoxidized natural rubber by adding an aromatic carboxylic acid to the rubber composition.

DESCRIPTION OF EMBODIMENTS

The present invention relates to a laminate including a film of a thermoplastic resin or a thermoplastic elastomer composition and a layer of a rubber composition.

Examples of the thermoplastic resin constituting the film include polyamide resins, polyester resins, polynitrile resins, polymethacrylate resins, polyvinyl resins, cellulose resins, fluorine resins, imide resins, polystyrene resins, and polyolefin resins. Examples of polyamide resins include nylon 6 (N6), nylon 66 (N66), nylon 46 (N46), nylon 11 (N11), nylon 12 (N12), nylon 610 (N610), nylon 612 (N612), nylon 6/66 (N6/66), nylon 6/66/12 (N6/66/12), nylon 6/66/610 (N6/66/610), nylon MXD6 (MXD6), nylon 6T, nylon 6/6T, nylon 9T, nylon 66/PP copolymer, and nylon 66/PPS copolymer. Examples of polyester resins include aromatic polyesters such as polybutylene terephthalate (PET), polyethylene terephthalate (PET), polyethylene isophthalate (PEI), PET/PEI copolymer, polyaxylate (PAR), polybutylene naphthalate (PEN), liquid crystal polyester, and polyoxyalkylene diimidic acid/polybutyrate terephthalate copolymer. Examples of polynitrile resins include polyacrylonitrile (PAN), polymethacrylonitrile, acrylonitrile/styrene copolymer (AS), methacrylonitrile/styrene copolymer, and methacrylonitrile/styrene/butadiene copolymer. Examples of polymethacrylate resins include polymethyl methacrylate (PMMA) and polyethyl methacrylate. Examples of polyvinyl resins include polyvinyl acetate (PVAc), poly (vinyl, alcohol) (PVA), ethylene-vinyl alcohol copolymer (EVOH), polyvinylidene chloride (PVDC), polyvinyl chloride (PVC), vinyl chloride/vinylidene chloride copolymer, and vinylidene chloride/methyl acrylate copolymer. Examples of cellulose resins include cellulose acetate and cellulose acetate butyrate. Examples of fluorine resins include polyvinylidene fluoride (PVDF), polyvinyl fluoride (PVF), polychlorofluoroethylene (PCTFE), and tetrafluoroethylene/ethylene copolymer (ETFE). Examples of imide resins include aromatic polyimide (PI). Examples of polystyrene resins include polystyrene (PS). Examples of polyolefin resins include polyethylene (PE) and polypropylene (PP).

Of these, poly (vinyl alcohol), ethylene-vinyl alcohol copolymer, nylon 6, nylon 66, nylon 11, nylon 12, nylon 610, nylon 612, nylon 6/66, nylon MXD6, and nylon 6T are preferred because they provide both fatigue resistance and air barrier properties.

To the thermoplastic resin, compounding ingredients commonly used in a resin composition, such as fillers, reinforcing agents, processing aids, stabilizers, and antioxidants, may be added in order to improve processability, dispersibility, heat resistance, oxidation resistance, and other properties to the extent that the effects of the present invention are not impaired. Plasticizers, which are preferably not added. from the viewpoint of air barrier properties and heat resistance, may be added to the extent that the effects of the present invention are not impaired.

The thermoplastic elastomer composition constituting the film is a composition obtained by dispersing an elastomeric component in a thermoplastic resin component, wherein the thermoplastic resin component forms a matrix phase, and the elastomeric component forms a dispersed phase.

The thermoplastic resin component constituting the thermoplastic elastomer composition may be the same thermoplastic resin as described above.

Examples of the elastomeric component constituting the thermoplastic elastomer composition include diene rubbers and hydrogenated versions thereof, olefin rubbers, halogen-containing rubbers, silicone rubbers, sulfur-containing rubbers, and fluororubbers.

Examples of diene rubbers and hydrogenated versions thereof include natural rubber (NR), isoprene rubber (IR), epoxidized natural rubber, styrene butadiene rubber (SER), butadiene rubber (BR) (high cis-BR and low-cis BR), acrylonitrile butadiene rubber (NER), hydrogenated NBR, and hydrogenated SER.

Examples of olefin rubbers include ethylene propylene rubber (EPM), ethylene propylene diene rubber (EPDM), maleic acid-modified ethylene propylene rubber (M-EPM), maleic anhydride-modified ethylene-α-olefin copolymer, ethylene-glycidyl methacrylate copolymer, maleic anhydride-modified ethylene-ethyl acrylate copolymer (modified EEA), butyl rubber (IIR), copolymer of isobutylene and an aromatic vinyl monomer or a diene monomer, acrylic rubber (ACM), and ionomers.

Examples of halogen-containing rubbers include halogenated butyl rubbers such as brominated butyl rubber (Br-IIR) and chlorinated butyl rubber (Cl-IIR), brominated isobutylene-p-methylstyrene copolymer (BIMS), halogenated isobutylene-isoprene copolymer rubber, chloroprene rubber (CR), hydrin rubber (CHR), chlorosulfonated polyethylene (CSM), chlorinated polyethylene (CM), and maleic acid-modified chlorinated polyethylene (M-CM). Examples of silicone rubbers include methyl vinyl silicone rubber, dimethyl silicone rubber, and methyl phenyl vinyl silicone rubber. Examples of sulfur-containing rubbers include polysuifide rubber. Examples of fluororubbers include vinylidene fluoride rubber, fluorine-containing vinyl ether rubber, tetrafluoroethylene-propylene rubber, fluorine-containing silicone rubber, and fluorine-containing phosphazene rubber.

Of these, brominated isobutylene-p-methylstyrene copolymer, maleic anhydride-modified. ethylene-α-olefin copolymer, ethylene-glycidyl methacrylate copolymer, and maleic anhydride-modified ethylene-ethyl acrylate copolymer are preferred from the viewpoint of air barrier properties.

To the elastomeric component, compounding ingredients commonly used in a rubber composition, such as any other reinforcing agents (fillers) including carbon black and silica, softeners, age resistors, and processing aids may be added to the extent that the effects of the present invention are not impaired.

Examples of the combination of the elastomeric component and the thermoplastic resin component constituting the thermoplastic elastomer composition include, but are not limited to halogenated butyl rubber and a polyamide resin, brominated isobutylene-p-methylstyrene copolymer rubber and a polyamide resin, butadiene rubber and a polystyrene resin, isoprene rubber and a polystyrene resin, hydrogenated butadiene rubber and a polystyrene resin, ethylene propylene rubber and a polyolefin resin, ethylene propylene diene rubber and a polyolefin resin, amorphous butadiene rubber and syndiotactic poly(1,2-polybutadiene), amorphous isoprene rubber and trans-poly(1,4-isoprene), and fluororubber and a fluororesin. The combination of butyl rubber and a polyamide resin, which provides excellent air barrier properties, is preferred, and in particular, the combination of brominated isobutylene-p-methylstyrene copolymer rubber, which is a modified butyl rubber, and nylon 6/66, nylon 6, or a blended resin of nylon 6/66 and nylon 6 is particularly preferred because it provides both fatigue resistance and air barrier properties.

The thermoplastic elastomer composition can be prepared by dispersing an elastomeric component (dispersed phase) in a thermoplastic resin component that is to form a matrix phase by melt kneading the thermoplastic resin component and the elastomeric component, for example, in a twin-screw kneading extruder. The weight ratio of the thermoplastic resin component to the elastomeric component is not critical and preferably 10/90 to 90/10, more preferably 15/35 to 90/10.

The thermoplastic resin or the thermoplastic elastomer composition can contain various additives to the extent that the effects of the present invention are not impaired.

The rubber composition constituting the layer of a rubber composition includes a rubber component and an unsubstituted or substituted aromatic carboxylic acid having a pKa of 1.5 to 4.0. The rubber composition can further contain compounding ingredients commonly used in a rubber composition, such as vulcanizing agents, vulcanization acceleration aids, vulcanization accelerators, reinforcing agents (fillers) including carbon black and silica, softeners, age resistors, and processing aids.

The rubber component includes at least epoxidized natural rubber and butadiene rubber. In the rubber component, epoxidized natural rubber accounts for 5 to 60% by weight, and butadiene rubber accounts for 20 to 50% by weight. When the proportion of epoxidized natural rubber is too small, it is difficult to provide sufficient adhesion, whereas when too large, cracks are likely to occur in a low-temperature environment depending on the high glass transition temperature of epoxidized natural rubber.

Epoxidized natural rubber is a modified natural rubber in which some unsaturated bonds are substituted with epoxy groups. This modification is typically achieved by epoxidation reaction.

The epoxidation reaction can be effected by reacting natural rubber with an epoxidizing agent. Useful epoxidizing agents include peracids such as m-chloroperbenzoic acid and peracetic acid. Other examples include carboxylic acids such as acetic acid and formic acid, carboxylic anhydrides such as acetic anhydride, and hydrogen peroxide. A catalyst such as sulfuric acid and p-toluene sulfonic acid, or a cation exchange resin such as sulfonated polystyrene may optionally be used. The epoxidation reaction is carried out at a temperature of preferably 0° C. to 150° C., more preferably 25° C. to 80° C. The time required to carry out the epoxidation reaction is preferably 0.25 hour to 10 hours, more preferably 0.5 hour to 3 hours.

The epoxidation reaction is preferably carried out in a solvent that is substantially capable of dissolving the rubber both in its original state and in the state of being epoxidized. Suitable solvents include aromatic solvents such as benzene, toluene, xylenes, and chlorobenzene, cycloaliphatic solvents such as cyclohexane and cyclopentane, and mixtures thereof. After the epoxidation, the epoxidized rubber is preferably removed or isolated from an acidic environment which can include an oxidizing agent and an acidic catalyst. The isolation can be achieved by filtration or by adding a dilute aqueous base to neutralize the acid and then coagulating the polymer. The epoxidized natural rubber can be coagulated by using an alcohol such as methanol, ethanol, or propanol. After the isolation procedure, an age resistor is typically added, and the final product can be dried using a technique such as vacuum distillation. Alternatively, any other known method for removing the polymer from a hydrocarbon solvent or the like, for example, steam stripping or drum drying can be used.

The epoxidized natural rubber is commercially available from Kumpulan Guthrie Beshad (Malaysia) under the trade name "Epoxyprene", grades ENR25 (the degree of epoxidation: about 25±2 mol %) and ENR50 (the degree of epoxidation: about 50±2 mol %). Similar products are also available from Ribber Research Institute (RRIM) in Malaysia.

The epoxidized natural rubber has a degree of epoxidation of preferably 10 to 75 mol %, more preferably 15 to 60 mol %, still more preferably 20 to 55 mol %, and most preferably 25 to 50 mol %. The degree of epoxidation refers to the percentage (by mole) of unsaturated bonds that have been epoxidized among unsaturated bonds that had been present in natural rubber before epoxidation. When the degree of epoxidation is too small, the epoxidized natural rubber needs to be compounded in large amounts, making it difficult to compound rubbers other than the epoxidized natural rubber, such as butadiene rubber, whereas when too large, the required amount of the epoxidized natural rubber is reduced, but it is difficult, to provide a rubber composition with a good phase structure.

Butadiene rubber is a rubber obtained by polymerizing butadiene. Butadiene units can take three types of microstructure (1,4-cis, 1,4-trans, 1,2-), and, therefore, butadiene rubbers having a different 1,4-cis bond content, such as high cis-butadiene rubber and low cis-butadiene rubber, are obtained depending on the polymerization method. Any type of butadiene rubber can be used, and preferred is high cis-butadiene rubber.

Examples of the rubber component other than the epoxidized natural rubber and the butadiene rubber include, but are not limited to, diene rubbers and hydrogenated versions thereof, olefin rubbers, halogen-containing rubbers, silicone rubbers, sulfur-containing rubbers, and fluororubbers.

Examples of diene rubbers and hydrogenated versions thereof include natural rubber (NR), isoprene rubber (IR), styrene butadiene rubber (SBA), acrylonitrile butadiene rubber (NBA), hydrogenated NBA, and hydrogenated SBA.

Examples of olefin rubbers include ethylene propylene rubber (EPM), ethylene propylene diene rubber (EPDM), maleic acid-modified ethylene propylene rubber (M-EPM), maleic anhydride-modified ethylene-α-olefin copolymer, ethylene-glycidyl methacrylate copolymer, maleic anhydride-modified ethylene-ethyl acrylate copolymer (modified EEA), butyl rubber (IIR), copolymer of isobutylene and an aromatic vinyl monomer or a diene monomer, acrylic rubber (ACM), and ionomers.

Examples of halogen-containing rubbers include halogenated butyl rubbers such as brominated butyl rubber (Br-IIR) and chlorinated butyl rubber (Cl-IIR), brominated isobutylene-p-methylstyrene copolymer (BIMS), halogenated isobutylene-isoprene copolymer rubber, chloroprene rubber (CR), hydrin rubber (CHR), chlorosulfonated polyethylene (CSM), chlorinated. polyethylene (CM), and maleic acid-modified chlorinated polyethylene (M-CM).

Examples of silicone rubbers include methyl vinyl silicone rubber, dimethyl silicone rubber, and methyl phenyl vinyl silicone rubber.

Examples of sulfur-containing rubbers include poly-sulfide rubber.

Examples of fluororubbers include vinylidene fluoride rubber, fluorine-containing vinyl ether rubber, tetrafluoroethylene-propylene rubber, fluorine-containing silicone rubber, and fluorine-containing phosphazene rubber.

Of these, from the viewpoint of co-crosslinkability with adjacent rubber materials, diene rubbers, olefin rubbers, and halogen-containing rubbers are preferred, and more preferred are natural rubber, styrene butadiene rubber, brominated butyl rubber, and ethylene-propylene-diene rubber.

The rubber composition includes an unsubstituted or substituted aromatic carboxylic acid having a pKa of 1.5 to 4.0.

"Aromatic carboxylic acid" refers to a compound formed by substituting at least one hydrogen in the aromatic ring of an aromatic compound with a carboxyl group. "Unsubstituted or substituted aromatic carboxylic acid" refers to an unsubstituted aromatic carboxylic acid or a substituted aromatic carboxylic acid. "Unsubstituted aromatic carboxylic acid" refers to an aromatic carboxylic acid having no substituent. "Substituted aromatic carboxylic acid" refers to an aromatic carboxylic acid having a substituent, and refers to a compound formed by substituting at least one hydrogen in the aromatic ring of an aromatic carboxylic acid with a substituent other than carboxyl. Examples of the substituent other than carboxyl include $C_1$-$C_6$ alkyl, hydroxyl, amino, and halogen.

"pKa" refers to an ionization exponent of an acid. "Ionization exponent of an acid" refers to a negative common logarithm of an ionization constant Ka of the acid. In other words, pKa is represented by the following equation.

$$pKa = -\log_{10} Ka$$

Smaller pKa values indicate stronger acids.

The pKa of the unsubstituted or substituted aromatic carboxylic acid is 1.5 to 4.0. When the pKa is too small, vulcanization is greatly influenced, whereas when too large, the unsubstituted or substituted aromatic carboxylic acid needs to be compounded in large amounts, resulting in a relatively reduced concentration of adhesive material.

Specific examples of the unsubstituted or substituted aromatic carboxylic acid having a pKa of 1.5 to 4.0 include benzoic acid (pKa=4.0), 2,4-dihydroxybenzoic acid (pKa=3.2), salicylic acid (o-hydroxybenzoic acid) (pKa=2.7), o-aminobenzoic acid (pKa=2.0), and 4-aminosalicylic acid (pKa=1.5), and these may be used alone or in combination of two or more.

The laminate of the present invention can be produced by laminating a rubber composition to a film of a thermoplastic resin or a thermoplastic elastomer composition. In one more specific example, it can be produced as described below. First, a thermoplastic resin or a thermoplastic elastomer composition is molded into a film using a molding apparatus, such as an inflation molding apparatus or a T-die extruder, to prepare a film of the thermoplastic resin or the thermoplastic elastomer composition. Next, using an apparatus such as a T-die extruder, a rubber composition. is extruded and laminated onto the film to produce a laminate.

The laminate of the present invention can be used as an inner liner material for pneumatic tires.

The pneumatic tire of the present invention is a pneumatic tire produced using the laminate as an inner liner material.

The pneumatic tire of the present invention can be produced by any conventional method. For example, the pneumatic tire can be produced as follows: the laminate of the present invention is placed as an inner liner material on a tire-building drum with a film of a thermoplastic resin or a thermoplastic elastomer composition facing the tire-building drum; components conventionally used to produce a tire, such as a carcass layer, a belt layer, and a tread layer composed of unvulcanized rubber, are sequentially laminated thereon; the drum is removed after molding to obtain a green tire; and then the green tire is vulcanized by heating according to a conventional method.

According to the present invention, in a laminate of a film of a thermoplastic resin or a thermoplastic elastomer composition and a layer of a rubber composition including epoxidized natural rubber, the adhesion between the film and the layer of a rubber composition can be improved without using a large amount of epoxidized natural rubber by adding an aromatic carboxylic acid to the rubber composition. In addition, since the present invention enables high adhesion without using a large amount of epoxidized natural rubber, the range of choice in rubber compounding widens, facilitating cost reduction and physical property control. In particular, when epoxidized natural rubber, which has poor low-temperature properties, is compounded in large amounts, the low-temperature durability can be reduced, e.g., cracking may occur at low temperatures, but in the present invention, the amount of epoxidized natural rubber can be reduced, which is expected to lead to improved low-temperature durability.

EXAMPLES (1) Forming Film

The following materials were compounded at a compounding ratio shown in Table 1 to prepare a thermoplastic elastomer composition, and the thermoplastic elastomer composition was molded using an inflation molding apparatus to form a film with a thickness of 0.2 mm.

Materials of Film

BIMS: Brominated isobutylene-p-methylstyrene copolymer "Exxpro (registered trademark) 3035" available from ExxonMobil Chemical Zinc oxide: "Zinc white No. 3" available from Seido Chemical Industry Co., Ltd.

Stearic acid: Industrial stearic acid available from Chiba Fatty Acid Co., Ltd.

Zinc stearate: Zinc stearate available from NOF Corporation

N6/66: Nylon 6/66 "UBE Nylon (registered trademark) 5033B" available from Ube industries, Ltd.

Modified EEA: Maleic anhydride-modified ethylene-ethyl acrylate copolymer "Rilsan BESNOTL" available from ARKEA Plasticizer: N-butyl benzene sulfonamide "BM-4" available from Daihachi Chemical Industry Co., Ltd.

TABLE 1

Composition of film

| Materials | Composition ratio (parts by weight) |
| --- | --- |
| BIMS | 100.0 |
| Zinc oxide | 0.5 |
| Stearic acid | 0.2 |
| Zinc stearate | 1.0 |
| N6/66 | 100.0 |
| Modified EEA | 10.0 |
| Plasticizer | 20.0 |

(2) Preparing Rubber Composition

The following materials were compounded in a Banbury mixer at compounding ratios (parts by weight) shown in Table 2 to Table 4 to prepare rubber compositions of Examples 1 to 8 and Comparative Examples 1 to 5.

Materials of Rubber Composition

Epoxidized natural rubber: "ENR-50" available from Kumpulan Guthrie Beshad, the degree of epoxidation=50 mol %

Natural rubber: "SIR-20"

Butadiene rubber: "BR1220" available from Zeon Corporation

Carbon black: "SEAST V" available from Tokai Carbon Co., Ltd.

Stearic acid: Industrial stearic acid available from Chiba Fatty Acid Co., Ltd.

Aromatic oil: "Desolex No 3" available from Showa Shell Sekiyu K. K.

Zinc oxide: "Zinc white No. 3" available from Seido Chemical Industry Co., Ltd.

Sulfur: 5% oil-extended sulfur available from Karuizawa Refinery

Vulcanization accelerator: Di-2-benzothiazolyl disulfide "Nocceler DM" available from Ouchi Shinko Chemical Industrial Co., Ltd.

(3) Producing Laminate

Onto the film formed in (1), the rubber composition prepared in (2) was extruded and laminated to a thickness of 0.7 mm to produce a laminate.

(4) Evaluating Laminate

The laminates produced were evaluated for peel strength, tire peeling, and tire failure. The evaluation results are shown in Table 2 to Table 4. Evaluation methods for each item are as described below.

[Peel Strength]

A sample of the laminate was vulcanized and then cut to a width of 25 mm, and the peel strength of the strip specimen was measured in accordance with JIS-K6256. The measured values of the peel strength (N/25 mm) were indexed with numbers according to the following criteria. All the indices but 0 are in a satisfactory range.

| Index | Peel strength (N/25 mm) |
|---|---|
| 0 | 0 to below 20 |
| 1 | 20 to below 25 |
| 2 | 25 to below 50 |
| 3 | 50 to below 75 |
| 4 | 75 to below 100 |
| 5 | 100 to below 200 |
| 6 | 200 or greater |

[Tire Peeling]

Using the laminate as an inner liner material, a tire of 195/65R15 size was produced by a conventional method. The tire was mounted, at a rim size of 15×6 JJ and an internal pressure of 200 kPa, to a front-engine front-drive (FF) car of 1800 cc displacement, and the car was driven 30,000 km in an urban area. The tire was then removed from the rim, and the interior was inspected to check for peeling failures of the laminate used as an inner liner material. Laminates suffering no peeling are indicated as "No", and laminates suffering peeling as "Yes".

[Tire Failure]

Using the laminate as an inner liner material, a tire of 195/65R15 size was produced by a conventional method. The tire was mounted, at a rim size of 15×6 JJ and an internal pressure of 200 kPa, to a front-engine front-drive (FF) car of 1800 cc displacement, and the car was driven 30,000 km in an urban area. The tire was then removed from the rim, and the interior was inspected to visually check for cracks of the laminate used as an inner liner material. Laminates having no appearance defect are indicated as "No", and laminates having appearance defects as "Yes". The mark "-" indicates that peeling was observed in "Tire Peeling" test and this tire failure test was not performed.

TABLE 2

|  | Comparative Example 1 | Comparative Example 2 | Example 1 | Example 2 | Example 3 | Example 4 |
|---|---|---|---|---|---|---|
| Epoxidized natural rubber | 9 | 9 | 9 | 9 | 30 | 30 |
| Natural rubber | 91 | 61 | 61 | 61 | 40 | 40 |
| Butadiene rubber | 0 | 30 | 30 | 30 | 30 | 30 |
| Carbon black | 60 | 60 | 60 | 60 | 60 | 60 |
| Stearic acid | 1 | 1 | 1 | 1 | 1 | 1 |
| 4-Aminosalicylic acid (pKa = 1.5) | — | — | — | — | — | — |
| o-aminobenzoic acid (pKa = 2.0) | — | — | — | — | — | — |
| Salicylic acid (pKa = 2.7) | 0 | 0 | 1 | 2 | 0.5 | 2 |
| 2,4-Dihydroxybenzoic acid (pKa = 3.2) | — | — | — | — | — | — |
| Benzoic acid (pKa = 4.0) | — | — | — | — | — | — |
| L-ascorbic acid (pKa = 4.2) | — | — | — | — | — | — |
| 3,4-Dihydroxybenzoic acid (pKa = 4.3) | — | — | — | — | — | — |
| Phenylpropionic acid (pKa = 4.4) | — | — | — | — | — | — |
| Aromatic oil | 7 | 7 | 7 | 7 | 7 | 7 |
| Zinc oxide | 3 | 3 | 3 | 3 | 3 | 3 |
| Sulfur | 2 | 2 | 2 | 2 | 2 | 2 |
| Vulcanization accelerator | 1.5 | 1.5 | 1.5 | 1.5 | 1.5 | 1.5 |
| Peel strength | 0 | 0 | 2 | 3 | 5 | 5 |
| Tire peeling | Yes | Yes | No | No | No | No |
| Tire failure | — | — | No | No | No | No |

TABLE 3

|  | Example 5 | Example 6 | Example 7 | Example 8 | Comparative Example 3 | Comparative Example 4 | Comparative Example 5 |
|---|---|---|---|---|---|---|---|
| Epoxidized natural rubber | 9 | 9 | 9 | 9 | 9 | 9 | 9 |
| Natural rubber | 61 | 61 | 61 | 61 | 61 | 61 | 61 |
| Butadiene rubber | 30 | 30 | 30 | 30 | 30 | 30 | 30 |
| Carbon black | 60 | 60 | 60 | 60 | 60 | 60 | 60 |
| Stearic acid | 1 | 1 | 1 | 1 | 1 | 1 | 1 |
| 4-Aminosalicylic acid (pKa = 1.5) | 2 | — | — | — | — | — | — |
| o-aminobenzoic acid (pKa = 2.0) | — | 2 | — | — | — | — | — |
| Salicylic acid (pKa = 2.7) | — | — | — | — | — | — | — |

TABLE 3-continued

| | Example 5 | Example 6 | Example 7 | Example 8 | Comparative Example 3 | Comparative Example 4 | Comparative Example 5 |
|---|---|---|---|---|---|---|---|
| 2,4-Dihydroxybenzoic acid (pKa = 3.2) | — | — | 2 | — | — | — | — |
| Benzoic acid (pKa = 4.0) | — | — | — | 2 | — | — | — |
| L-ascorbic acid (pKa = 4.2) | — | — | — | — | 2 | — | — |
| 3,4-Dihydroxybenzoic acid (pKa = 4.3) | — | — | — | — | — | 2 | — |
| Phenylpropionic acid (pKa = 4.4) | — | — | — | — | — | — | 2 |
| Aromatic oil | 7 | 7 | 7 | 7 | 7 | 7 | 7 |
| Zinc oxide | 3 | 3 | 3 | 3 | 3 | 3 | 3 |
| Sulfur | 2 | 2 | 2 | 2 | 2 | 2 | 2 |
| Vulcanization accelerator | 1.5 | 1.5 | 1.5 | 1.5 | 1.5 | 1.5 | 1.5 |
| Peel strength | 2 | 2 | 2 | 2 | 0 | 0 | 0 |
| Tire peeling | No | No | No | No | Yes | Yes | Yes |
| Tire failure | No | No | No | No | — | — | — |

INDUSTRIAL APPLICABILITY

The laminate of the present invention is suitable for use in producing a pneumatic tire. The pneumatic tire of the present invention is suitable for use as a car tire.

The invention claimed is:

1. A laminate, comprising:
a film of a thermoplastic resin or a thermoplastic elastomer composition; and
a layer of a rubber composition, wherein the rubber composition comprises a rubber component comprising 5 to 60% by weight of an epoxidized natural rubber and 20 to 50% by weight of a butadiene rubber, and the rubber composition comprises an unsubstituted or substituted aromatic carboxylic acid having a pKa of 1.5 to 4.0 in an amount of 0.5 to 5 parts by weight based on 100 parts by weight of the rubber component.

2. The laminate according to claim 1, wherein the unsubstituted or substituted aromatic carboxylic acid is at least one selected from salicylic acid, 4-amino salicylic acid, benzoic acid, o-aminobenzoic acid, and 2,4-dihydroxybenzoic acid.

3. The composition according to claim 1, wherein the epoxidized natural rubber has a degree of epoxidation of 10 to 75 mol %.

4. The laminate according to claim 1, wherein the thermoplastic resin is at least one selected from the group consisting of poly(vinyl alcohol), ethylene-vinyl alcohol copolymer, nylon 6, nylon 66, nylon 11, nylon 12, nylon 610, nylon 612, nylon 6/66, nylon MXD6, and nylon 6T.

5. The laminate according to claim 1, wherein the thermoplastic elastomer composition is a composition obtained by dispersing an elastomeric component in a thermoplastic resin component, the thermoplastic resin component being at least one selected from the group consisting of poly(vinyl alcohol), ethylene-vinyl alcohol copolymer, nylon 6, nylon 66, nylon 11, nylon 12, nylon 610, nylon 612, nylon 6/66, nylon MXD6, and nylon 6T, the elastomeric component being at least one selected from the group consisting of brominated isobutylene-p-methylstyrene copolymer, maleic anhydride-modified ethylene-α-olefin copolymer, ethylene-glycidyl methacrylate copolymer, and maleic anhydride-modified ethylene-ethyl acrylate copolymer.

6. An inner liner material for pneumatic tires, comprising the laminate according to claim 1.

7. A pneumatic tire produced using the laminate according to claim 1 as an inner liner material.

8. The composition according to claim 2, wherein the epoxidized natural rubber has a degree of epoxidation of 10 to 75 mol %.

9. The laminate according to claim 8, wherein the thermoplastic resin is at least one selected from the group consisting of poly(vinyl alcohol), ethylene-vinyl alcohol copolymer, nylon 6, nylon 66, nylon 11, nylon 12, nylon 610, nylon 612, nylon 6/66, nylon MXD6, and nylon 6T.

10. The laminate according to claim 2, wherein the thermoplastic resin is at least one selected from the group consisting of poly(vinyl alcohol), ethylene-vinyl alcohol copolymer, nylon 6, nylon 66, nylon 11, nylon 12, nylon 610, nylon 612, nylon 6/66, nylon MXD6, and nylon 6T.

11. The laminate according to claim 3, wherein the thermoplastic resin is at least one selected from the group consisting of poly(vinyl alcohol), ethylene-vinyl alcohol copolymer, nylon 6, nylon 66, nylon 11, nylon 12, nylon 610, nylon 612, nylon 6/66, nylon MXD6, and nylon 6T.

12. The laminate according to claim 8, wherein the thermoplastic elastomer composition is a composition obtained by dispersing an elastomeric component in a thermoplastic resin component, the thermoplastic resin component being at least one selected from the group consisting of poly(vinyl alcohol), ethylene-vinyl alcohol copolymer, nylon 6, nylon 66, nylon 11, nylon 12, nylon 610, nylon 612, nylon 6/66, nylon MXD6, and nylon 6T, the elastomeric component being at least one selected from the group consisting of brominated isobutylene-p-methylstyrene copolymer, maleic anhydride-modified ethylene-α-olefin copolymer, ethylene-glycidyl methacrylate copolymer, and maleic anhydride-modified ethylene-ethyl acrylate copolymer.

13. The laminate according to claim 2, wherein the thermoplastic elastomer composition is a composition obtained by dispersing an elastomeric component in a thermoplastic resin component, the thermoplastic resin component being at least one selected from the group consisting of poly(vinyl alcohol), ethylene-vinyl alcohol copolymer, nylon 6, nylon 66, nylon 11, nylon 12, nylon 610, nylon 612, nylon 6/66, nylon MXD6, and nylon 6T, the elastomeric component being at least one selected from the group consisting of brominated isobutylene-p-methylstyrene copolymer, maleic anhydride-modified ethylene-α-olefin copolymer, ethylene-glycidyl methacrylate copolymer, and maleic anhydride-modified ethylene-ethyl acrylate copolymer.

14. The laminate according to claim 3, wherein the thermoplastic elastomer composition is a composition obtained by dispersing an elastomeric component in a thermoplastic resin component, the thermoplastic resin component being at least one selected from the group consisting of poly(vinyl alcohol), ethylene-vinyl alcohol copolymer, nylon 6, nylon 66, nylon 11, nylon 12, nylon 610, nylon 612, nylon 6/66, nylon MXD6, and nylon 6T, the elastomeric component being at least one selected from the group consisting of brominated isobutylene-p-methylstyrene copolymer, maleic anhydride-modified ethylene-α-olefin copolymer, ethylene-glycidyl methacrylate copolymer, and maleic anhydride-modified ethylene-ethyl acrylate copolymer.

15. An inner liner material for pneumatic tires, comprising the laminate according to claim 2.

16. An inner liner material for pneumatic tires, comprising the laminate according to claim 3.

17. An inner liner material for pneumatic tires, comprising the laminate according to claim 4.

18. An inner liner material for pneumatic tires, comprising the laminate according to claim 5.

19. A pneumatic tire produced using the laminate according claim 2 as an inner liner material.

20. A pneumatic tire produced using the laminate according claim 3 as an inner liner material.

* * * * *